US005508846A

United States Patent [19]

Hall

[11] Patent Number: 5,508,846
[45] Date of Patent: Apr. 16, 1996

[54] WIDE FIELD OF VIEW OBJECTIVE LENS ASSEMBLY

[75] Inventor: John M. Hall, Alexandria, Va.

[73] Assignee: The United States of America as represented by the Secretary of the Army, Washington, D.C.

[21] Appl. No.: 260,443

[22] Filed: Jun. 15, 1994

[51] Int. Cl.$^6$ .................................................. G02B 25/00
[52] U.S. Cl. .................... 359/643; 359/648; 359/418; 250/214 VT
[58] Field of Search .................... 359/739, 740, 359/648, 649, 643, 644, 410, 411, 412, 418, 756; 250/214 VT

[56] References Cited

U.S. PATENT DOCUMENTS 3,867,018   2/1975   Shoemaker .................... 350/216
5,204,774   4/1993   Owen, Jr. et al. .................... 359/418

Primary Examiner—Georgia Y. Epps
Assistant Examiner—Dawn-Marie Bey
Attorney, Agent, or Firm—Milton W. Lee; John E. Holford; Alain L. Bashore

[57] ABSTRACT

An objective lens assembly provides up to 60 degrees field of view for the ANVIS image intensifier goggle. A first lens subassembly positioned on the focal axis faces a external view and substantially corrects pupil aberrations in an aperture stop located after the first subassembly. A second lens subassembly is then located after the aperature stop on the focal axis. Color and field aberration corrections is provided while maintaining substantially high quality focus by a third lens subassembly. A lens element after the third lens subassembly on the focal axis flattens the image plane over the intensifier image format such that there results a format of up to 25 mm with a photocathode resolution for up to a 60 degree field of view.

2 Claims, 8 Drawing Sheets

WIDE FIELD OF VIEW OBJECTIVE LENS ASSEMBLY

BACKGROUND OF THE INVENTION

1. Field of the Invention

The present invention generally relates to objective lens assemblies and more specifically, to objective lens assemblies which provide wide field of view, low distortion, and high resolution for image intensification devices.

2. Description of Prior Art

The general purpose of any objective lens assembly is to collect light from an object scene and focus the rays into an image plane. For image intensification devices, the image plane is received directly by the intensifier photocathode. The optics are designed for color correction in the red and near infra-red spectral region, with wavelengths ranging from 0.9 microns to about 0.6 microns. The current production capabilities for intensifier tubes allow 18 mm to 25 mm image height formats, and require what is known in the prior art as a fast F# lens system on the order of F/1.2 in order to collect enough photons per degree in the field of view.

Typical third generation intensifier tubes available to the military have resolution of 40 cycles/millimeter or more over the 18 mm to 25 mm formats, and so the objective lenses must have good contrast resolution (modulation transfer function, or "MTF") out to these spatial frequencies. The objective is normally designed to focus at infinity, and closer ranges can be accommodated by slightly increasing the distance from the objective lens to the intensifier tube. The term "wide field of view (FOV)" is relative to the current state-of-the-art, and so anything wider than 40 degree circular FOV is considered "wide". Image intensifier goggles are most often designed for unity power, meaning that they introduce no magnification of the scenery in order to simulate normal human eye viewing.

The current state-of-the art for fielded military equipment is the ANVIS goggle system, which features an F/1.2 objective lens assembly with a 40 degree circular FOV, and an 18 mm image height format on the intensifier tube. The current ANVIS goggle can provide visual acuity as good as 20/40 on the Snellen ratio scale if light conditions are adequate. Resolution of this high quality is dependent first on the objective lens assembly, then the intensifier tube, and finally the eyepiece optics assembly. For certain applications, especially aircraft pilotage, a wide field of view capability is desired. There has yet been invented a objective lens assembly that increases the ANVIS goggle FOV up to 60 degrees while maintaining ANVIS resolution quality.

While the prior art has reported using objective lens assemblies none have established a basis for a specific apparatus that is dedicated to the task of resolving the particular problem at hand. What is needed in this instance is an objective lens assembly that increases the ANVIS goggle FOV up to 60 degrees while maintaining ANVIS resolution quality.

SUMMARY OF THE INVENTION

It is therefore one object of the invention to provide an objective lens assembly that increases the ANVIS goggle FOV up to 60 degrees while maintaining ANVIS resolution quality.

According to the invention, there is disclosed an objective lens assembly for providing up to 60 degrees field of view for the ANVIS image intensifier goggle. A first lens subassembly position on the focal axis faces an external view and substantially corrects pupil aberrations in an aperture stop located after the first subassembly. A second lens subassembly is the located after the aperature stop on the focal axis. Color and field aberration correction is then provided while maintaining substantially high quality focus by a third lens subassembly. A lens element after the third lens subassembly on the focal axis flattens the image plane over the intensifier image format such that there results a 25 mm format with a photocathode resolution for up to a 60 degree field of view.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
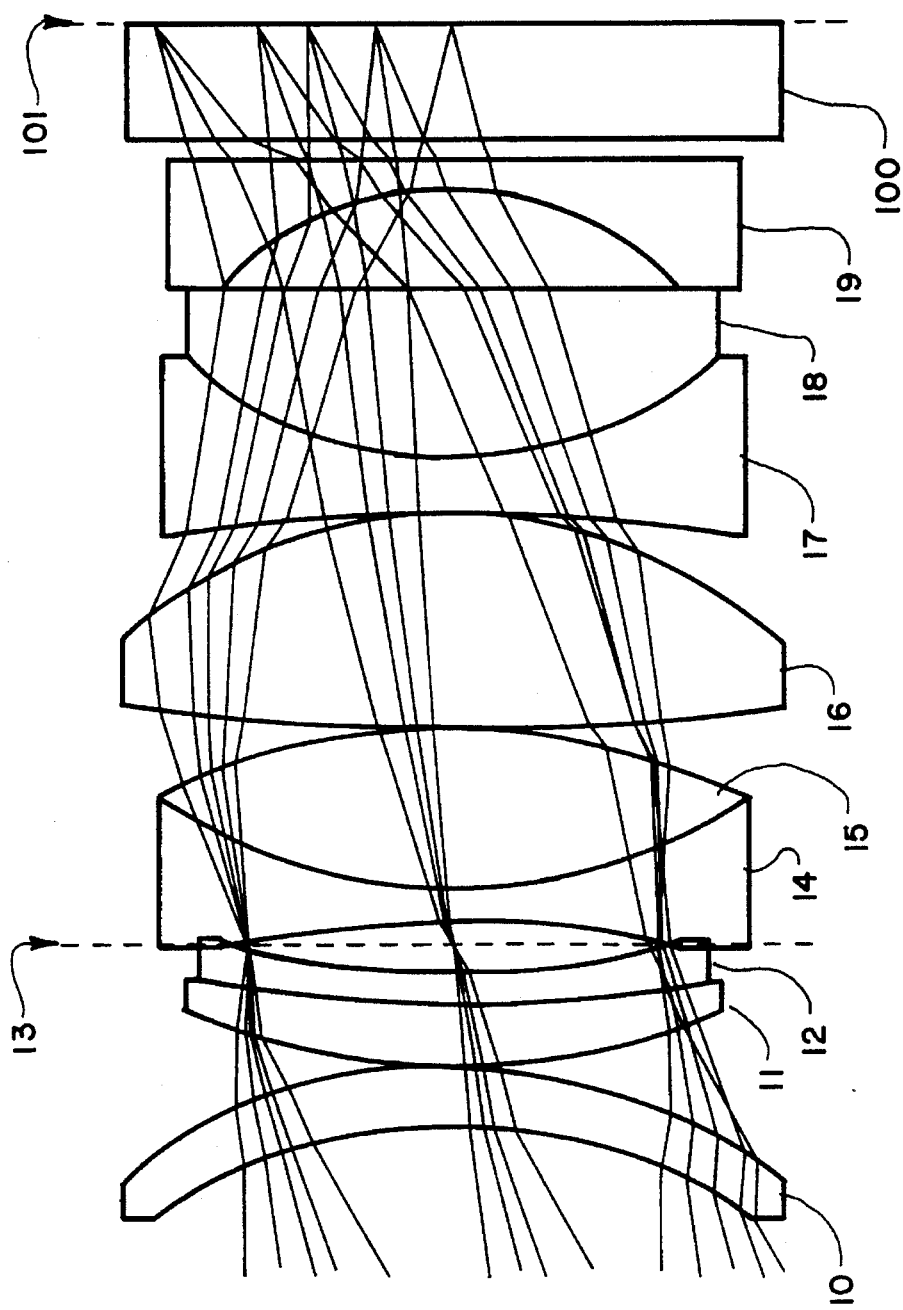
FIG. 1 is a side view of the objective lens assembly superimposed on an optical ray-trace diagram for a first embodiment.

Referring now to the drawings, and more particularly to FIG. 1, there is shown the objective lens assembly superimposed on an optical ray-trace diagram, as the first embodiment. The objective lens assembly includes lens element 10 which faces the outer world with a concave front and aspheric back surface. Elements 11 and 12 form a cemented doublet, whereby along with element 10 there is corrected as much as possible the pupil aberrations in aperture stop 13. Lens elements 14 and 15 form another cemented doublet positioned after aperture stop 13. Lens element 16, along with lens elements 17 and 18 form another cemented doublet and provide color and field aberration correction while also maintaining a high quality focus. Lens element 19 has a strong, conic divergent curvature in order to flatten image plane 101 over the intensifier format at the back of glass cover plate 100.

The prescription data for each element is described in Table 1 below where all dimensions are given in millimeters and a positive and negative radius indicates the center of curvature is to the right and left, respectively, a according to what is shown in FIG. 1.

the next surface. Thickness between lens elements denote air gaps. Front and back aperture diameters are also disclosed for each lens element with equivalent diameters shown for air gaps.

TABLE 1

| ELEMENT NUMBER | RADIUS OF CURVATURE | | THICKNESS | APERTURE DIAMETER | | GLASS |
|---|---|---|---|---|---|---|
| | FRONT | BACK | | FRONT | BACK | |
| OBJECT | INF | | INFINITY | | | |
| 10 | −21.8065CC | A (1) | 2.3682 | 24.5998 | 24.7624 | SF15 Schott |
| | | | 0.1000 | | | |
| 11 | 27.9826CX | 54.9000CC | 2.2703 | 18.8856 | 17.6752 | BASF54 Schott |
| 12 | 54.9000CX | A (2) | 1.3072 | 17.6752 | 16.3953 | SF53 Schott |
| | | | 1.0171 | | | |
| 13 | | | APERTURE STOP | 16.1915 | | |
| 14 | | | 0.9206 | | | |
| 15 | −41.4933CC | 20.8195CC | 1.3000 | 16.3176 | 20.0823 | SF54 Schott |
| | 20.8195CX | −25.5478CX | 6.3000 | 20.0823 | 21.1212 | LASK02 Ohara |
| 16 | | | 0.1000 | | | |
| | A (3) | −19.6293CX | 8.3371 | 22.8601 | 23.7405 | LAK10 Schott |
| | | | 0.1000 | | | |
| 17 | −63.5790CC | 16.2292CC | 2.1617 | 20.9600 | 19.0654 | SF3 Schott |
| 18 | 16.2292CX | 438.3341CC | 6.3956 | 19.0654 | 18.0463 | LAK10 Schott |
| | | | 3.9222 | | | |
| 19 | −12.5848CC | −384.9873CX | 1.3000 | 18.0349 | 20.6063 | SF5 Schott |
| | | | 0.6000 | | | |
| 100 | INF | INF | 4.5000 | 21.2465 | 23.7521 | FK5 Schott |
| | IMAGE DISTANCE = | | 0.0000 | | | |
| IMAGE | INF | | | | 24.9993 | |

Each of lens elements 11–12 and 14–19 are described in TABLE 1 in terms of radius of curvature for front and back of each lens where CC denotes concave and CX denotes convex. The thickness for all the objects described in TABLE 1 is the axial distance to the next surface, and the image diameter shown above is a paraxial value not a ray traced value. The reference wavelength is 721.3 nanometers for the spectral region of 560.0 to 876.2 nanometers.

The values A(1), A(2), and A(3) denote aspheric surfaces which are described in terms of the constants listed in Table 2 below:

Glass materials utilized for the lens elements are also described in Table 1 by glass code known in the art, but each lens element may be made of other materials that are functionally equivalent. The refractive indices at respective wavelengths are shown in TABLE 3 for the glass materials utilized since glass compositions are known to possibly change over time.

TABLE 2

| ASPHERIC | CURV | K | A | B | C | D |
|---|---|---|---|---|---|---|
| A(1) | −0.04861401 | 0.000000 | 7.82530E−06 | −1.11153E−08 | 2.15123E−10 | −2.38797E−13 |
| A(2) | 0.01344510 | 0.000000 | 5.67052E−05 | 1.78798E−07 | 6.84830E−10 | 3.50347E−11 |
| A(3) | 0.00845039 | 0.000000 | −2.90200E−06 | −1.79986E−08 | 7.54531E−10 | −2.98986E−12 | which were derived using the following equation (EQUATION 1):

$$Z = \frac{(CURV)Y^2}{1 + (1 - (1+K)(CURV)^2 Y^2)^{1/2}} + (A)Y^4 + (B)Y^6 + (C)Y^8 + (D)Y^{10}$$

Referring again to Table 1, the lens assembly also is described in terms of thickness defined as axial distance to

TABLE 3

| glass code | 867.22 nm wavelength | 831.87 nm wavelength | 777.41 nm wavelength | 721.27 nm wavelength | 665.29 nm wavelength | 614.69 nm wavelength | 560.82 nm wavelength |
|---|---|---|---|---|---|---|---|
| SF15_SCHOTT | 1.680375 | 1.682065 | 1.684509 | 1.687598 | 1.691488 | 1.695999 | 1.702336 |
| BASF54_SCHOTT | 1.717856 | 1.719543 | 1.721975 | 1.725042 | 1.728896 | 1.733356 | 1.739609 |
| SF53_SCHOTT | 1.708131 | 1.709953 | 1.712593 | 1.715941 | 1.720169 | 1.725082 | 1.731996 |
| SF54_SCHOTT | 1.719899 | 1.721782 | 1.724515 | 1.727984 | 1.732366 | 1.737460 | 1.744635 |
| LASK02_OHARA | 1.772759 | 1.774124 | 1.776038 | 1.778378 | 1.781232 | 1.784443 | 1.788820 |

TABLE 3-continued

| | | | | | | | |
|---|---|---|---|---|---|---|---|
| LAK10_SCHOTT | 1.707419 | 1.708683 | 1.710448 | 1.712596 | 1.715205 | 1.718130 | 1.722106 |
| SF5_SCHOTT | 1.655837 | 1.657383 | 1.659613 | 1.662425 | 1.665956 | 1.670036 | 1.675746 |
| FK5_SCHOTT | 1.481004 | 1.481699 | 1.482647 | 1.483772 | 1.485105 | 1.486569 | 1.488517 |
| SF3_SCHOTT | 1.719199 | 1.721071 | 1.723789 | 1.727240 | 1.731602 | 1.736675 | 1.743821 |

It is understood that the present invention is not glass types listed.

Dimensions for entrance pupil, exit pupil, effective focal length (EFL), F number, and overall length, all in millimeters is given below in Table 4:

TABLE 4

Entr Pupil
Diameter = 16.5000
Distance = 4.5458
Exit Pupil
Diameter = 11.5828
Distance = −15.2375
Overall Length = 43.0000
F/# = 1.3121
EFL = 21.6501

The focal length provides the power field of view over a 25 mm image format. Image quality during dark, overcast starlight is comparable to ANVIS because of two reasons:

1. the 25 mm format provides plenty of photocathode resolution for 60 degree field of view, and 2. the estimated lens transmission is 85%, yielding a T# (defined as the F # divided by the square root of the transmission) =1.4 which means photons are collected over a large solid angle comparable to ANVIS.

While on-axis points of reference are considered in determining the optical performance of the objective lens assembly, off-axis points of reference are also a consideration when determining the amount of light going through the system, such as that described by vignetting. The projection of the entrance pupil, exit pupil, and intermediate aperture(s) all onto the plane of the entrance or exit pupil for different field angles will measure the amount of vignetting as the amount of light cut off as the field angle changes at specified coordinates. TABLE 5 describes vignetting (which can be converted to % by multiplying by 100) at specified field angles for the entrance diameter, in the +X, −X, +Y, −Y directions.

TABLE 5

| field angle | +\−0 | +\−8 | +\−16 | +\−25 | +\−30 |
|---|---|---|---|---|---|
| pupil | | | | | |
| +X | 0.00000 | −0.00072 | −0.00258 | −0.00579 | −0.01163 |
| −X | 0.00000 | −0.00072 | −0.00258 | −0.00579 | −0.01163 |
| +Y | 0.00000 | 0.00281 | 0.00184 | −0.00262 | −0.01353 |
| −Y | 0.00000 | −0.00750 | −0.01941 | −0.03977 | 0.09376 |

The relatively minimal amounts of vignetting across the entire field of view reduces the likelihood that the image brightness would vary across the field of view. This is an improvement over the ANVIS, which allowed 30% or more vignetting at the edge of its field.

All optics systems for at least a partial hand-held and head mounted usage requires a center of mass analysis and weight of the overall system. TABLE 6 discloses a center of mass analysis for the first embodiment disclosed in FIG. 1. Volume and weight is measured in liters and grams respectfully with the center of mass defined on a standard X—Y—Z cartesian coordinate system.

TABLE 6

| ELEMENT NUMBER | VOLUME | SPECIFIC GRAVITY | WEIGHT | CENTER OF MASS | | |
|---|---|---|---|---|---|---|
| | | | | X | Y | Z |
| 10 | 1204.545 | 4.060 | 4.890 | 0.000 | 0.000 | −0.846 |
| 11 | 616.907 | 4.410 | 2.721 | 0.000 | 0.000 | 1.824 |
| 12 | 461.280 | 4.450 | 2.053 | 0.000 | 0.000 | 1.225 |
| 14 | 1593.226 | 4.560 | 7.265 | 0.000 | 0.000 | 1.291 |
| 15 | 1362.300 | 4.790 | 6.525 | 0.000 | 0.000 | 3.262 |
| 16 | 3003.897 | 3.810 | 11.445 | 0.000 | 0.000 | 3.346 |
| 17 | 2030.183 | 4.640 | 9.420 | 0.000 | 0.000 | 2.065 |
| 18 | 1597.259 | 3.810 | 6.086 | 0.000 | 0.000 | 4.014 |
| 19 | 1499.985 | 4.070 | 6.105 | 0.000 | 0.000 | −0.885 |
| 100 | 2361.696 | 2.450 | 5.786 | 0.000 | 0.000 | 2.250 |

A total weight for the first embodiment is 62.29579 grams with a system center of mass at (0.00, 0.00, 20.414) measured from the first surface of the system. This weight is a little-over twice the weight of the ANVIS objective, and is a direct consequence of using the 25 mm format instead of ANVIS 18 mm. The larger format is required to provide a larger field of view with comparable resolution.

Operational performance characteristics of the optics assembly of both first and second embodiments described in the graphical representations shown in FIG. 2 and FIGS. 4 through 9 are understood as approximate in nature (being a composite representation of performance for both embodiments) and as such do not limit the present invention to exact data points but are intended to show overall performance trends.

Figure 2:
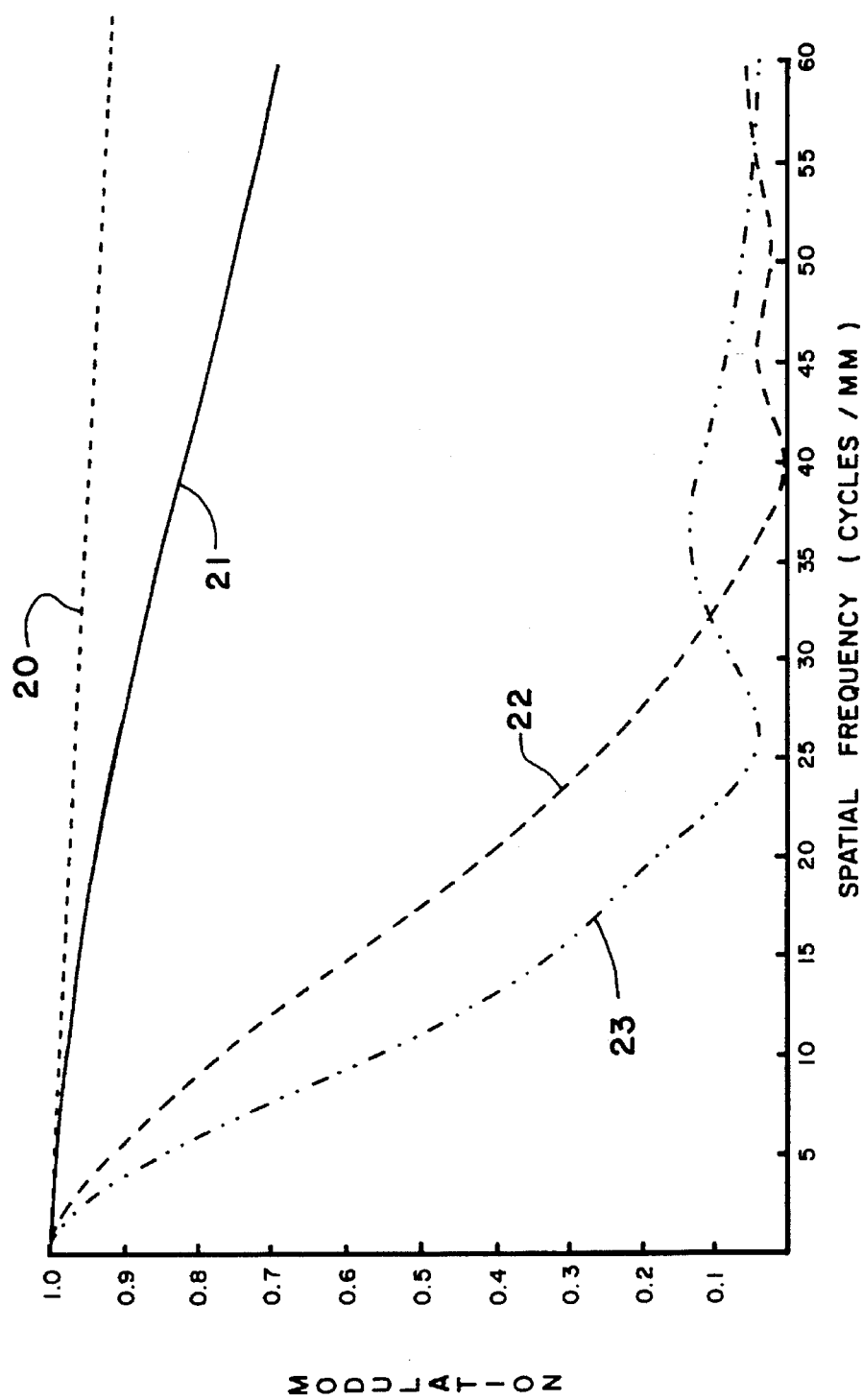
FIG. 2 is a graphical plot of modulation transfer function (MTF) performance for the objective lens assembly of FIG. 1.

FIG. 2 is a graphical plot of modulation transfer function (MTF) resolution performance of the objective lens assembly. One of the performance measurements of an optics assembly is its resolution, represented as the on-axis MTF at zero degrees field of view (FOV) and the off-axis MTF at the maximum FOV which for the present invention is + or −30 degrees FOV (60 degree total). In FIG. 2, line 20 is the diffraction limit and line 21 is the on-axis MTF. Lines 22 and 23 represent the tangential and sagittal components of a 60 degree total FOV respectfully. As seen from FIG. 2, the MTF on-axis yields high resolution at approximately 0.82 at 40 cycles/mm.

Figure 3:
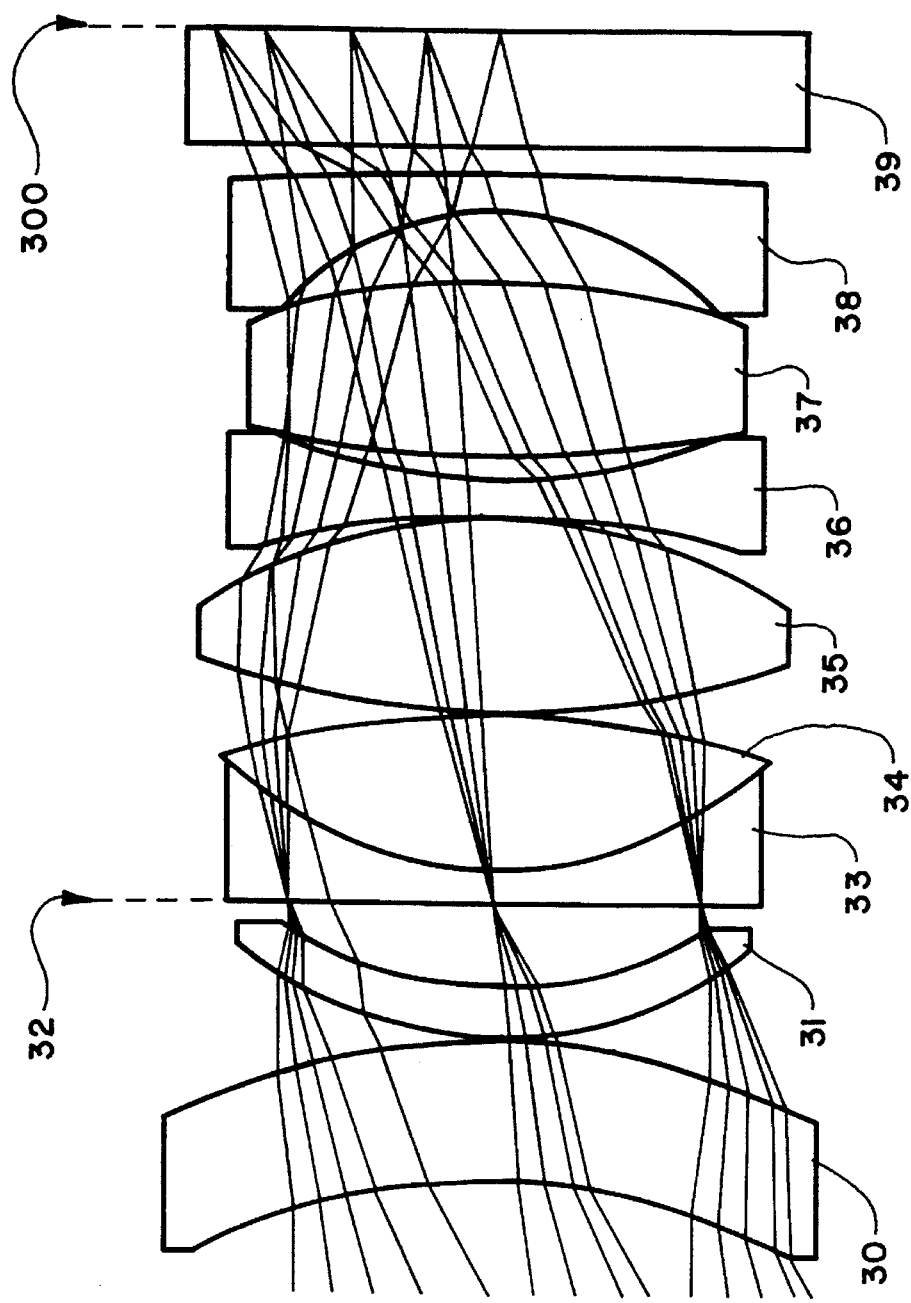
FIG. 3 is a side view of the objective lens assembly superimposed on an optical ray-trace diagram for a second embodiment.

FIG. 3, there is shown the objective lens assembly superimposed on an optical ray-trace diagram for the second embodiment of the present invention. The objective lens assembly includes lens element 30 which faces the outer world with a concave front surface and a conic back surface of parabolic shape characteristics. Lens element 31 also includes a back surface that is conic. These surfaces correct as much as possible for pupil aberrations in aperture stop 32. Aperture stop 32 itself is located almost directly on the flat surface of lens element 33, which is also a cemented doublet with lens 34. Lens 35 and 36 help for color and field aberration corrections. Lens 37 has a conic back surface to help maintain a high quality focus, and lens 38 has a strong, conic divergent in order to flatten image plane 300 over the intensifier format at the back of glass plate 39.

The prescription data for each element is described in Table 7 below where all dimensions are given in millimeters and a positive and negative radius indicates the center of curvature is to the right and left respectively according to what is shown in FIG. 3.

TABLE 8

| ASPHERIC | CURV | K |
|---|---|---|
| A (1) | −0.03870322 | −1.626750 |
| A (2) | −0.05182779 | 2.062159 |
| A (3) | −0.02788242 | −6.855833 |
| A (4) | −0.09511037 | −0.474816 |

As seen in TABLE 8, no aspheric surfaces are utilized in the second embodiment.

The thickness for all the objects described in TABLE 7 is the axial distance to the next surface, and the image diameter shown above is a paraxial value not a ray traced value. The reference wavelength is 721.3 nanometers for the spectral region of 560.0 to 876.2 nanometers. The lens assembly also is described in terms of thickness defined as axial distance to the next surface. Thickness between lens elements denote air gaps. Front and back aperture diameters are also disclosed for each lens element with equivalent diameters shown for air gaps.

Glass materials utilized for the lens elements are also described in Table 7 by glass code known in the art, but each lens element may be made of other materials that are functionally equivalent. The refractive indices at respective wavelengths are shown in TABLE 9 for the glass materials utilized since glass compositions are known to may change over time.

TABLE 7

| ELEMENT NUMBER | RADIUS OF CURVATURE | | THICKNESS | APERTURE DIAMETER | | GLASS |
|---|---|---|---|---|---|---|
| | FRONT | BACK | | FRONT | BACK | |
| OBJECT | INF | | INFINITY | | | |
| 30 | −25.8581CC | A (1) | 5.5000 | 24.1152 | 23.6448 | SF15 Schott |
| | | | 0.1000 | | | |
| 31 | 16.9671CX | A (2) | 2.0166 | 18.8079 | 17.1971 | BASF54 Schott |
| | | | 3.0697 | | | |
| 32 | | | APERTURE STOP | 16.6166 | | |
| | | | 0.1000 | | | |
| 33 | 1241.4592CX | 16.1366CC | 1.4000 | 16.7666 | 19.5947 | SF54 Schott |
| 34 | 16.1366CX | −34.7865CX | 6.1723 | 19.5947 | 20.2952 | YGH52 Ohara |
| | | | 0.1000 | | | |
| 35 | 36.8618CX | −21.2580CX | 7.6698 | 21.7701 | 21.7452 | LAK10 Schott |
| | | | 0.1000 | | | |
| 36 | −36.0450CC | 24.6990CC | 1.4348 | 19.6637 | 18.1940 | SF3 Schott |
| | | | 0.9369 | | | |
| 37 | 52.1087CX | A (3) | 6.8612 | 18.1940 | 17.5024 | LAK10 Schott |
| | | | 2.8223 | | | |
| 38 | A (4) | −158.2766CX | 1.4000 | 17.4953 | 19.6955 | SF5 Schott |
| | | | 1.0000 | | | |
| 39 | INF | INF | 4.5000 | 20.5350 | 22.9403 | FK5 Schott |
| | IMAGE DISTANCE = | | 0.0005 | | | |
| IMAGE | INF | | | 24.9991 | | |

Each of lens elements 30–31 and 33–39 are described in TABLE 7 in terms of radius of curvature for front and back of each lens where CC denotes concave and CX denotes convex.

The values A(1), A(2), and A(3), which described aspheric surfaces in TABLE 2 for the first embodiment does not describe aspheric surfaces for the second embodiment, since the constants A, B, C and D are zero. The second embodiment utilizes only the first two parameters of EQUATION 1 and those two parameters are listed in TABLE 8 below:

TABLE 9

| glass code | 867.22 nm wavelength | 831.87 nm wavelength | 777.41 nm wavelength | 721.27 nm wavelength | 665.29 nm wavelength |
|---|---|---|---|---|---|
| SF15_SCHOTT | 1.680375 | 1.682065 | 1.684509 | 1.687598 | 1.6914 |
| BASF54_SCHOTT | 1.717856 | 1.719543 | 1.721975 | 1.725042 | 1.7288 |
| SF54_SCHOTT | 1.719899 | 1.721782 | 1.724515 | 1.727984 | 1.7323 |
| YGH52_OHARA | 1.772759 | 1.774124 | 1.776038 | 1.778378 | 1.7812 |
| LAK10_SCHOTT | 1.707419 | 1.708683 | 1.710448 | 1.712596 | 1.7152 |
| SF3_SCHOTT | 1.719200 | 1.721071 | 1.723789 | 1.727240 | 1.7316 |
| SF5_SCHOTT | 1.655838 | 1.657383 | 1.659613 | 1.662426 | 1.6659 |
| FK5_SCHOTT | 1.481004 | 1.481699 | 1.482647 | 1.483772 | 1.4851 |

It is understood that the present invention is not limited to the glass types listed.

Dimensions for entrance pupil, exit pupil, and overall length (OAL), all in millimeters is given below in Table 10:

TABLE 10

Entr Pupil
  Diameter = 16.0000
  Distance = 7.1155
Exit Pupil
  Diameter = 11.1961
  Distance = −15.1428
Overall Length = 45.1836
F/# = 1.3531
EFL = 21.65

These values are almost identical to the first embodiment, thus both embodiments will have similar overall performance. The second embodiment utilizes an objective lens that uses only spherical and conical (parabolic) curvatures, which are easier to fabricate.

TABLE 11 describes the percent vignetting at specified field angles for the entrance diameter, exit diameter of the second embodiment.

TABLE 11

| field angle | +/−0 | +/−8 | +/−16 | +/−25 | +/−30 |
|---|---|---|---|---|---|
| pupil | | | | | |
| +X | 0.00000 | 0.00139 | 0.00582 | 0.01560 | 0.02419 |
| −X | 0.00000 | 0.00139 | 0.00582 | 0.01560 | 0.02419 |
| +Y | 0.00000 | −0.01052 | −0.01466 | −0.01165 | 0.19243 |
| −Y | 0.00000 | 0.01904 | 0.05161 | 0.11612 | 0.17158 |

There is slightly more vignetting compared to the first embodiment, but it is still less than ANVIS. Image brightness will still be fairly uniform across the field of view.

Figure 7:
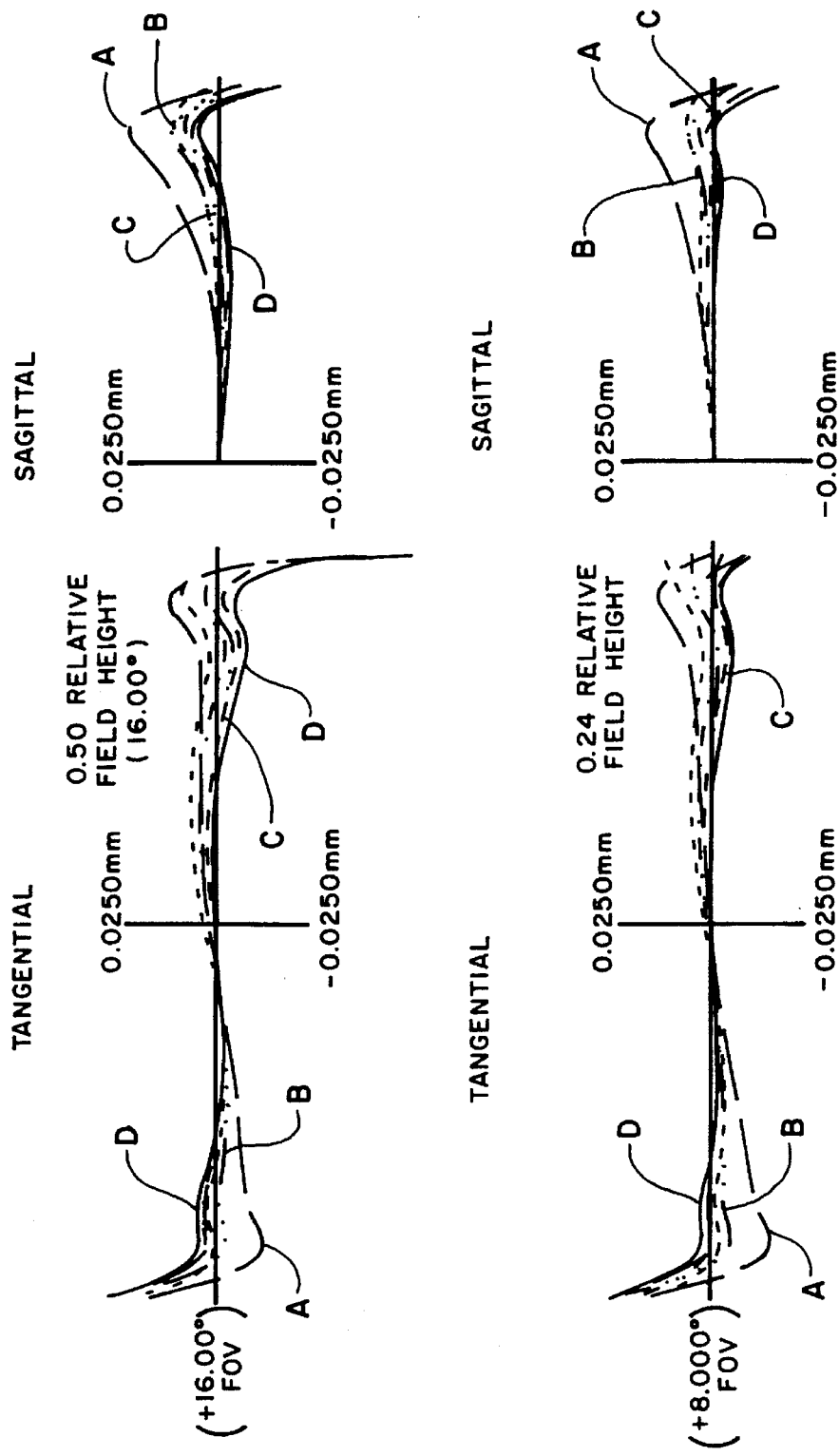
FIG. 7 is a composite graphical plot of X and Y fan meridional ray aberrations for +16.00 degree off axis input and +8.000 degree off axis input, both for the first and second embodiments of the objective lens assembly.

TABLE 12 discloses a center of mass analysis for the first embodiment disclosed in FIG. 7. Volume and weight is measured in liters and grams respectfully with the center of mass defined on a standard x—y—z cartesian coordinate system.

TABLE 12

| ELEMENT NUMBER | VOLUME | SPECIFIC GRAVITY | WEIGHT | CENTER OF MASS X | Y | Z |
|---|---|---|---|---|---|---|
| 30 | 3026.624 | 4.060 | 12.288 | 0.000 | 0.000 | 1.061 |
| 31 | 639.521 | 4.410 | 2.820 | 0.000 | 0.000 | 2.597 |
| 33 | 1206.063 | 4.560 | 5.500 | 0.000 | 0.000 | 1.895 |
| 34 | 1229.400 | 4.790 | 5.889 | 0.000 | 0.000 | 3.472 |
| 35 | 2189.457 | 3.810 | 8.342 | 0.000 | 0.000 | 3.521 |
| 36 | 1226.096 | 4.640 | 5.689 | 0.000 | 0.000 | 0.884 |
| 37 | 1757.327 | 3.810 | 6.695 | 0.000 | 0.000 | 3.290 |
| 38 | 1420.033 | 4.070 | 5.780 | 0.000 | 0.000 | −0.962 |
| 39 | 2206.905 | 2.450 | 5.407 | 0.000 | 0.000 | 2.250 |

A total weight for the second embodiment is 58.40964 grams with a system center of mass at (0.00, 0.00, 20.494) measured from the first surface of the system. This center of mass system is slightly less than the first embodiment because fewer lenses are used.

Figure 4:
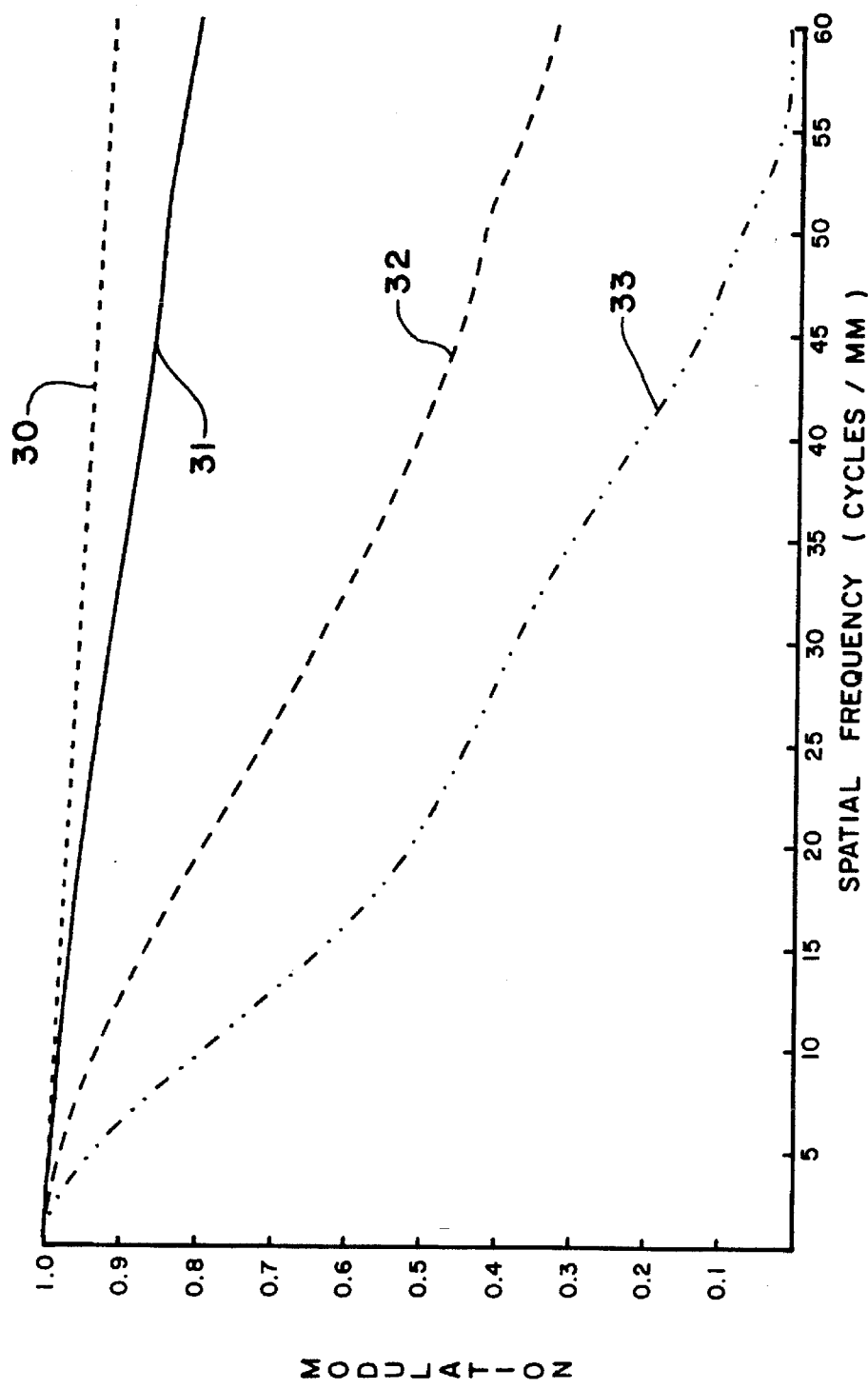
FIG. 4 is a graphical plot of MTF performance for the objective lens assembly of FIG. 3.

FIG. 4 is a graphical plot of MTF resolution performance of the objective lens assembly. Line 30 is the diffraction limit and line 31 is the on-axis MTF. Line 32 and 33 represent the tangential and radial components of a 60 degree total FOV respectfully. As seen from FIG. 4, the MTF on-axis yields high resolution at approximately 0.88 at 40 cycles/mm. The full field MTF's are improved over the first embodiment. This is often the fortunate consequence of allowing greater vignetting at the edge of the field. Since ANVIS MTF at 40 Lp/mm does not exceed 0.80 each of the embodiments disclose improvement over the prior art.

Figure 5:
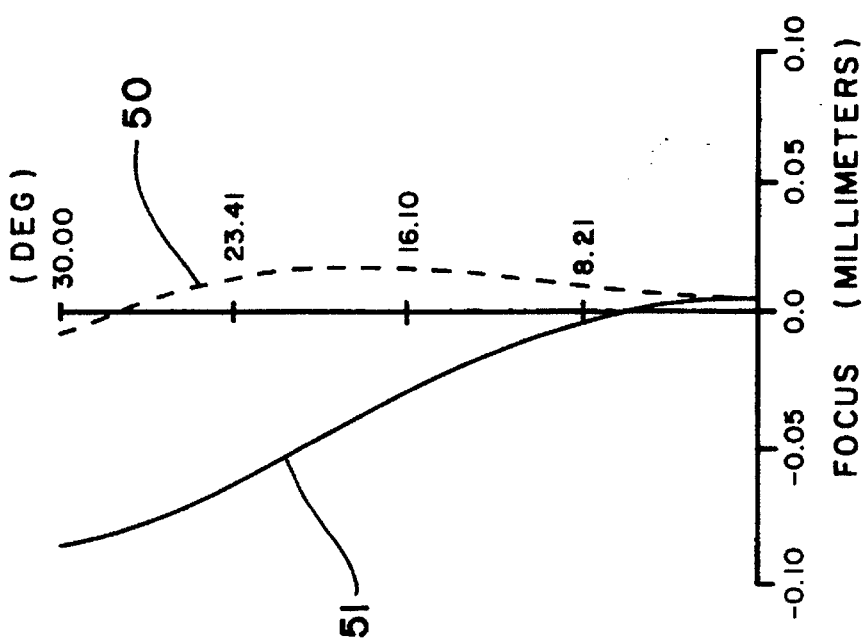
FIG. 5 is the composite astigmatic field curvature plot for both first and second embodiments of the objective lens assembly.

FIG. 5 is a composite field curvature plot for the objective lens assemblies of both first and second embodiments. A sharp focus is desired in an optical system but especially in complex optical systems there is a problem with astigmatism which gives rise to blurred images at the margins of the FOV. Line 50 is the tangential astigmatic field curve while line 51 is the sagittal component of the astigmatic field curve. As shown in FIG. 5, astigmatism easily meets a less than 0.22 diopter astigmatic curvature (resulting in the MTF loss at the edges of the field of view).

Figure 6:
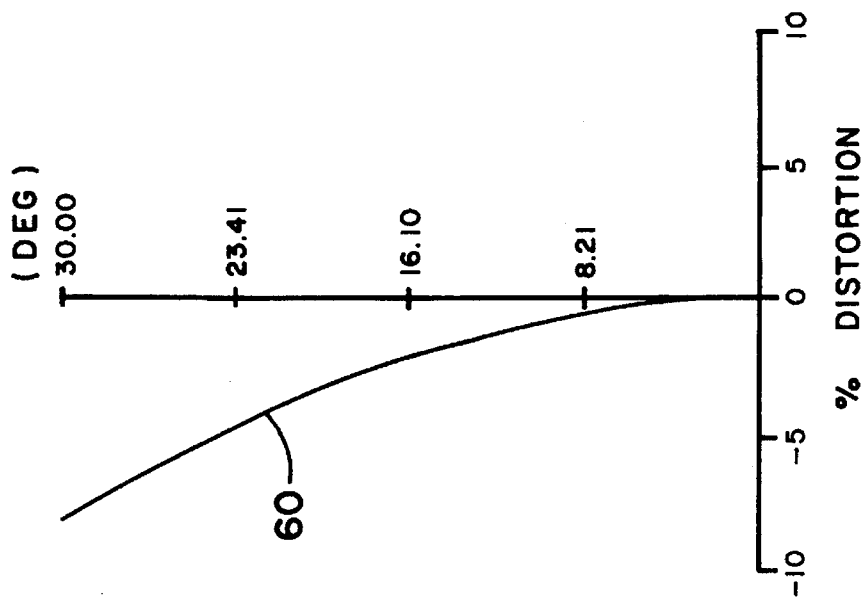
FIG. 6 is the composite distortion field curvature plot for both first and second embodiments of the objective lens assembly.

FIG. 6 is a composite graphical plot of distortion performance for the objective lens assemblies of both first and second embodiments. An approximately uniform lateral magnification over the entire FOV is desired, and is measured in terms of distortion. Line 60 is the percent distortion for the binocular optics assembly performance. As seen in FIG. 6, distortion does not approach a "greater than minimal" 10% at +/−30 degrees FOV.

Figure 8:
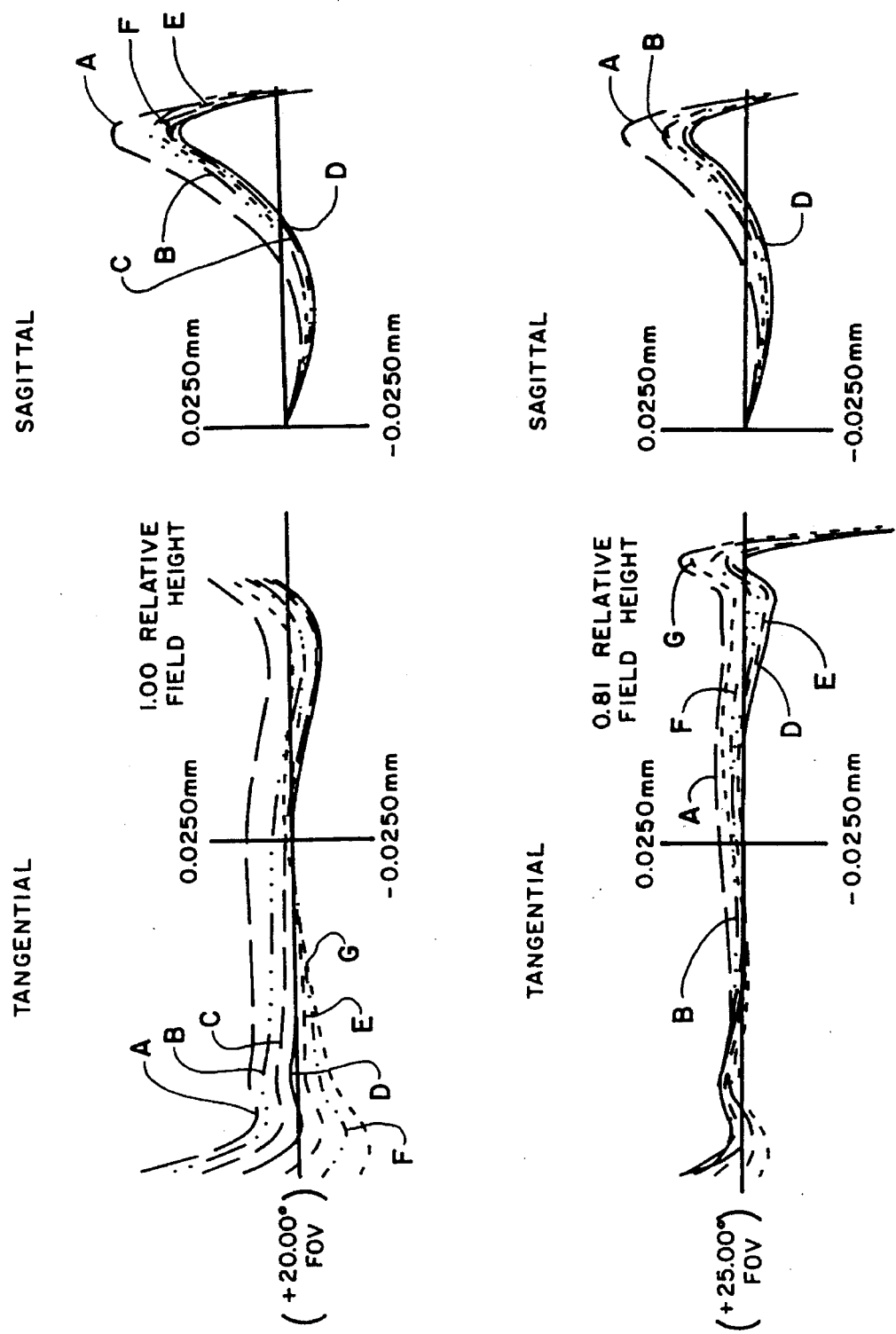
FIG. 8 is a composite graphical plot of X and Y fan meridional ray aberrations for +30.00 degree off axis input and +25.00 degree off axis input, both for the first and second embodiments of the objective lens assembly.
Figure 9:
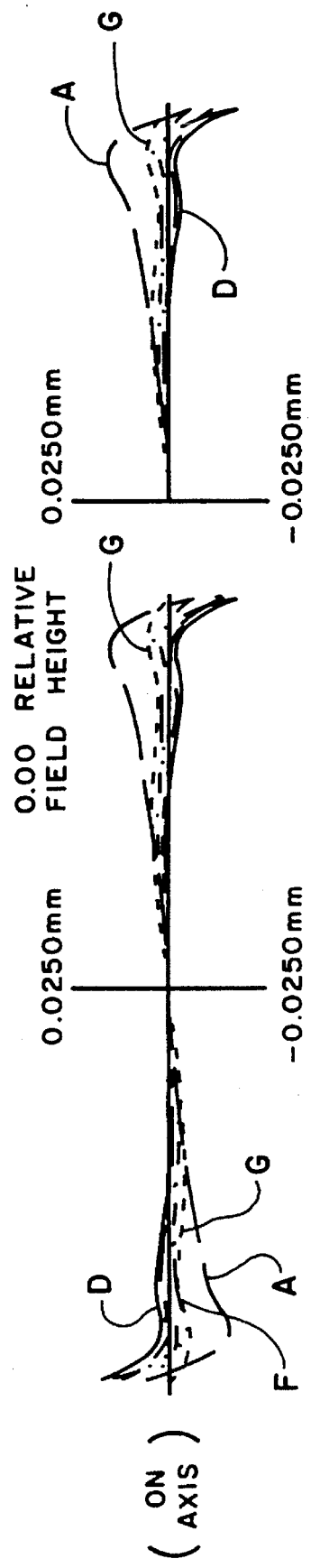
FIG. 9 is a composite graphical plot of X and Y fan meridional ray aberrations for on-axis input to the first and second embodiments of the objective lens assembly.

FIGS. 7, 8 and 9 show the composite graphical plots of X and Y fan meridional ray aberrations for: +16.00 and +8.00 degree off axis input; +30.00 and +25.00 degree off axis input; and on-axis input respectfully, each for the first and second embodiments of the objective lens assembly. Each X and Y fan is derived by taking measurements at only one wavelength band at a time. Meridional ray aberration plots represent the aberrations of the entire optics assembly with the different figures representing different angles of entry of the radiation into the refractive system. Referring to FIGS. 7, 8 and 9, there is shown in the plots of the various figures with wavelengths corresponding to 560.8 nm, 614.7 nm, 665.3 nm, 721.3 nm, 777.4 nm, 831.9 nm, and 876.2 nm (labeled as A through G respectfully). As can be seen in these meridional ray plots for the objective lens assembly, all are below 0.025 mrad which is the acceptance level of the assembly. Rim ray fan plots illustrate focus error margins over the wavelength spectrum. They indicate types of aberrations present and often correlate directly with the MTF curve.

With the second embodiment there is included one fewer lens and no general aspheric curvatures. Both embodiments feature a meniscus, concave front lens, high resolution MTF of greater than 0.82 at 40 cycles/mm, distortion less than 10%, and a 25 mm format image plane. The larger format is desirable because it spreads the 60 degree FOV over a larger area on the tube (since the tube resolution is expressed in cycles per millimeter, the more millimeters the more cycles of resolution are possible over the FOV). The 25 mm format height increase the overall glass weight to approximately 60 grams. The embodiments can be scaled down to an 18 mm format if desired, which will also reduce the weight by approximately the same factor.

While this invention has been described in terms of preferred embodiment consisting of a binocular optics assembly, those skilled in the art will recognize that the invention can be practiced with modification within the spirit and scope of the appended claims.

Having thus described my invention, what I claim as new and desire to secure by Letters Patent is as follows:

1. An objective lens assembly for providing a substantially 60 degrees field of view for ANVIS image intensifier goggles including:

a first lens subassembly positioned on the focal axis which faces the external view and substantially corrects pupil aberrations in an aperture stop located after the first subassembly;

a second lens subassembly after the aperture stop on the focal axis;

a third lens subassembly after the second lens subassembly on the focal axis for providing color and field aberration correction while maintaining substantially high quality focus;

a lens element after the third lens subassembly on the focal axis for flattening the image plane over the intensifier image format such that there results a F# on the order of F/1.2, and an image plane diameter within the range of 18 to 25 mm which encompasses the designated 60 degree field of view.

2. A technique for providing a substantially 60 degrees field of view for ANVIS image intensifier goggles by use of an objective lens assembly including the steps of:

receiving external light on the focal axis which is substantially corrected for pupil aberrations in an aperture stop;

providing color and field aberration correction on the focal axis while maintaining substantially high quality focus after the aperture stop; and flattening the image plane over the intensifier image format such that there results a F# on the order of F/1.2, and a image plane diameter within the range of 18 to 25 mm which encompasses the designated 60 degree field of view.

\* \* \* \* \*